United States Patent [19]
Pelletier

[11] 4,154,098
[45] May 15, 1979

[54] VOLUME MEASURING METHOD AND APPARATUS

[76] Inventor: Wayne N. Pelletier, MRB Box 326 Lot 48, Bangor, Me. 04401

[21] Appl. No.: 857,111

[22] Filed: Dec. 5, 1977

[51] Int. Cl.² .................... G01F 17/00; G01F 15/06
[52] U.S. Cl. .................................................. 73/149
[58] Field of Search ................ 73/149, 196, 202, 219, 73/220, 272 A, 429, 32 R, 37.5, 37.9, 447, 407 R

[56] References Cited

U.S. PATENT DOCUMENTS

| | | | |
|---|---|---|---|
| 2,116,636 | 5/1938 | Neumann | 73/149 UX |
| 2,849,881 | 9/1958 | Anderson | 73/149 X |
| 3,060,724 | 10/1962 | Smith et al. | 73/149 X |
| 3,060,735 | 10/1962 | Baker | 73/149 |
| 3,113,448 | 12/1963 | Hardway et al. | 73/149 X |
| 3,241,361 | 3/1966 | Broughton | 73/149 |
| 3,402,602 | 9/1968 | Costelet | 73/149 |
| 3,489,002 | 1/1970 | Thompson | 73/149 |
| 4,112,738 | 9/1978 | Turner | 73/149 X |

FOREIGN PATENT DOCUMENTS

| | | | |
|---|---|---|---|
| 1317298 | 6/1963 | France | 73/149 |
| 294075 | 6/1971 | U.S.S.R. | 73/149 |
| 393595 | 12/1973 | U.S.S.R. | 73/149 |

*Primary Examiner*—Donald Watkins
*Attorney, Agent, or Firm*—David F. Gould

[57] ABSTRACT

The volume of a solid or liquid sample is determined by placing the sample in a first volume scaled sample chamber in communication with a source of liquid, a second volume scaled chamber also in communication with the source of liquid is used as a comparison or reference chamber, liquid is forced to a reference point in the comparison chamber and the position of the liquid-gas interface in the first or sample chamber is recorded, the volume of the unknown sample is then determined by the insertion of the first chamber scale reading into a previously derived formula or graph.

9 Claims, 3 Drawing Figures

VOLUME MEASURING METHOD AND APPARATUS

BACKGROUND OF THE INVENTION

1. Field of the Invention

This invention relates to a process and apparatus for determining the volume of an irregular solid or liquid sample utilizing the compressibility of a gas such as air. The invention can also determine the skeletal volume of a porous solid or powder. The gas is used as a displacement medium; its compressibility permits measuring the volume of the sample. By the use of two volume marked or scaled chambers, it is possible to determine the sample volume by inserting the chamber readings in a forumla or graph derived herein. The gas within both chambers is simultaneously compressed. One chamber contains the sample of unknown volume, the other chamber is used as a compression reference.

2. Description of Prior Art

The prior art in this field of volume measurement has included: direct measurement of geometrically regular solid; methods of water displacement; methods of air displacement dependent on Boyle's Law such as two chamber devices where one chamber is first evacuated or pressurized and then placed in communication with a second chamber. Methods of air displacement independent of Boyle's Law, best described as air comparison pycnometers have also been used. These devices have one or more disadvantages such as slow operation, inaccuracy, and poor reliability.

SUMMARY OF THE INVENTION

This invention solves the above mentioned problems of volume measurement by providing an air comparison pycnometer type volume measuring process and device. Speed in measurement is possible because both sample and reference chambers are simultaneously compressed. Greater accuracy than the previous art devices achieve is obtained by using a coil of small diameter transparent or translucent tubing as a portion of each chamber. This results in a long spiral movement of the liquid displacement medium with a small change in volume. Reliability is better than in the prior art air comparison pycnometers because the moving solid parts such as the compressing pistons are kept from the point of communication between the two chambers. In this way, both chambers are unaffected by any changes in the pressurizing source parts such as the pistons. In addition to measuring volume, the invention can also be used to measure surface areas. The fast operation of my device makes it more practical to undertake such measurements as the water, asphalt and organic contents in solids and air entrainment in concrete.

I use a first chamber to hold a sample and a second chamber as a reference. Both chambers are marked or scaled in units of volume.

DESCRIPTION OF DRAWINGS

Other objects and advantage of the invention will become apparent as the details of construction and operation are more fully hereafter described and claimed, reference being had to the accompanying drawings forming a part hereof, where like numerals refer to like parts throughout, and in which:

ADVANTAGES OF INVENTION

This invention has the advantage of being very accurate because of the fine readings that may be taken from the long transparent or translucent coils. A second advantage is that simultaneous compression of both coils also speeds volume measurements.

DESCRIPTION OF PREFERRED EMBODIMENT

Figure 1:
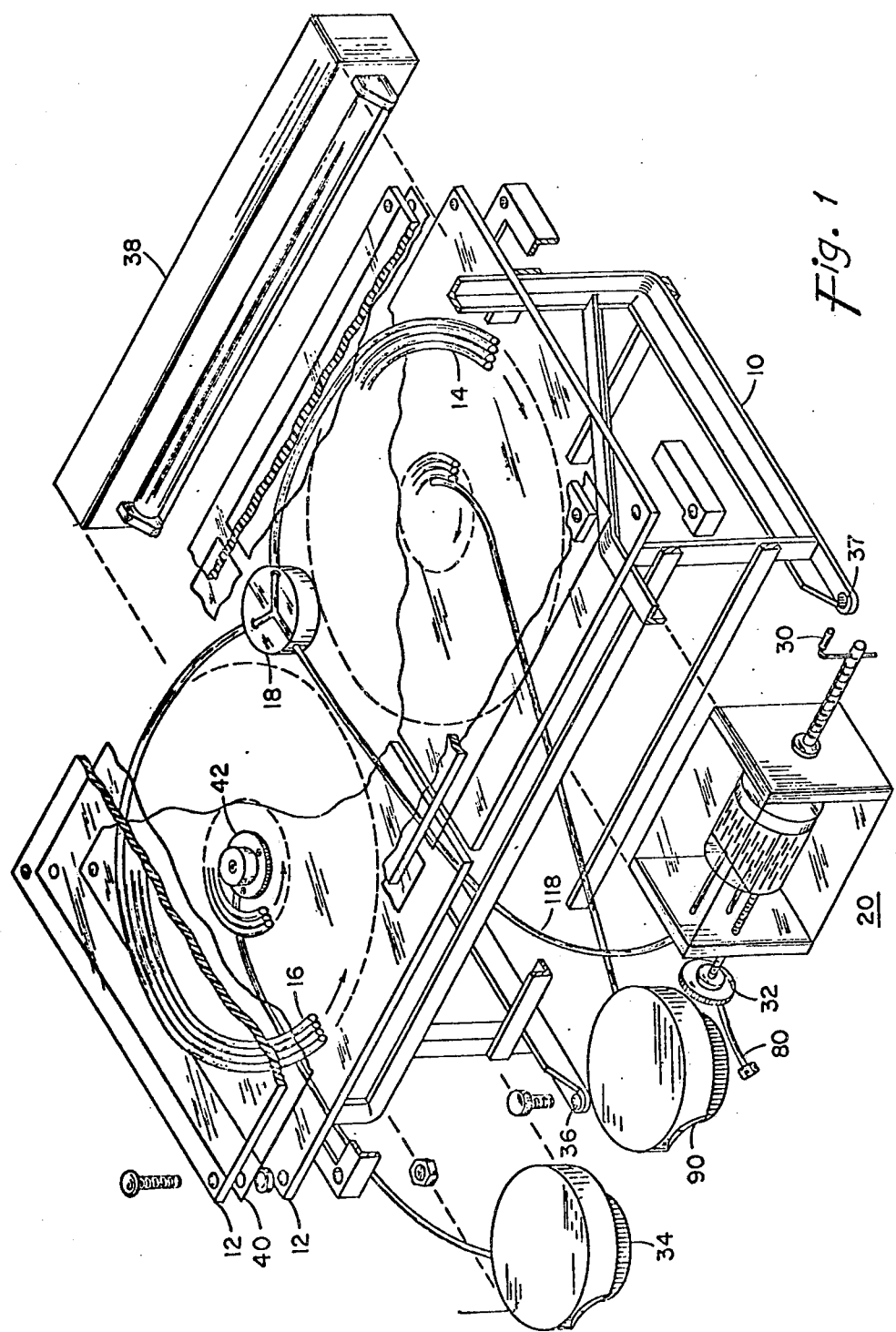
FIG. 1 is an elevation view of the invention as seen from the front or operator's position with some parts exploded.

With reference now to the drawings and in particular to FIG. 1, it will be seen that a frame 10 has been provided supporting one or more rigid transparent plastic sheets 12. The transparent sheets 12 are used to mount two coils of transparent or translucent fine diameter plastic tubing 14 and 16. I provide a "Y" coupling 18 to connect one end of each of the coils 14 and 16 and to join them to a source of fluid pressure indicated generally at 20. The sources of fluid pressure 20 will be explained more fully with reference to FIG. 2. The fluid pressure source 20 is provided with a hand crank 30 for quick pressurization and a fine adjustment wheel 32 for slow pressurization. I provided a first removable sample chamber 34 in communication with the end of coil 16 (hereinafter called the first or sample coil) remote from "Y" coupling 18. The fluid pressure source 20 is provided with a length of tubing 80 the functions of which will be explained later with reference to FIG. 2. Adjustable legs 36 and 37 are provided to level the coils 14 and 16. The coils are kept on the same level to keep hydrostatic pressures equal. I refer to coil 14 as the second or reference coil. A second chamber 90 is provided in communication with the end of coil 14 remote from the "Y" coupling 18. I refer to chamber 90 as the balancing chamber. In this way, the coils 14 and 16 will roughly match in volume and conduct the displacement fluid at approximately the same rate with a nominal size sample in the sample chamber 34. This aids in taking coil readings. A bullseye level 42 may be used for leveling purposes. It will be understood that the sample chamber 34 and the balancing chamber 90 are air tight in operation of the invention but can be opened by hand to insert samples such as sample 116 of FIG. 3 whose volume is being determined. In the case of balancing chamber 90, the chamber 90 may be opened to insert the balancing volume 114 of FIG. 3. Chambers 34 and 90 may be provided with optional valves (not shown) to release pressure or vacuum without opening the chambers. A transparent or translucent overlay 40 may be provided with a premarked scale of volume graduations (not shown) for the coils 14 and 16 as it is difficult to mark the tubing of the coils directly with volume graduations.

Figure 2:
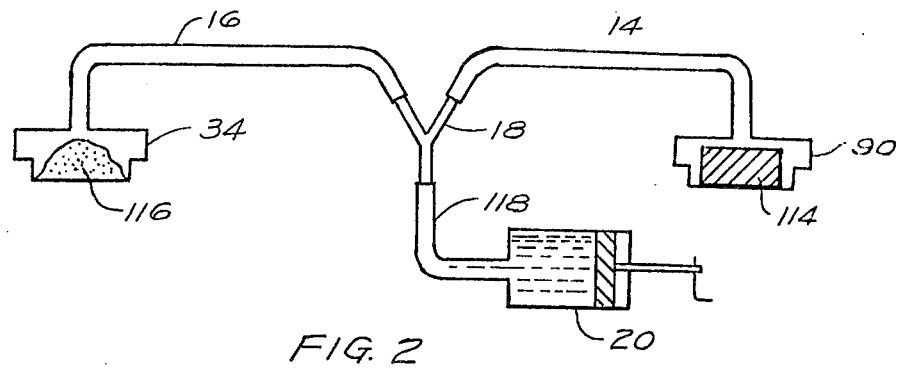
FIG. 2 is a hydropneumatic circuit diagram of the invention.

The coil overlay 40 has been marked with periodic heavy spirals (not shown) so spaced as to delineate approximately equal areas to aid in reading the coils. FIG. 2 shows in simplified form the salient features of FIG. 1 such as the fluid pressure source 20 connected to outlet tube 118. The outlet tube 118 joins the fluid pressure source 20 to the Y junction 18. The Y junction 18 conducts the fluid flow into coils 14 and 16 which are connected to reference or balancing chamber 90 and sample chamber 34 respectively. A sample 116 may be placed in sample chamber 34 and a balancing volume 114 may be placed in balancing chamber 90.

Figure 3:
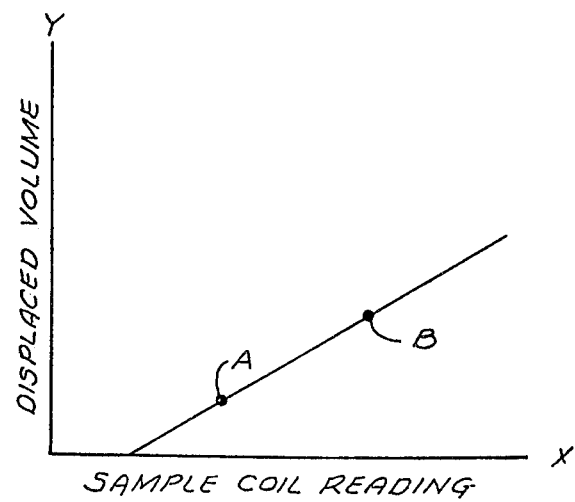
FIG. 3 is a graph showing how volume is measured by the invention.

FIG. 3 illustrates the relationship between the reading on the sample coil 16 and the displaced volume of air in sample chamber 34 which is the volume of the sample 116 of FIG. 2. Point A is the reading of sample coil 16 that corresponds to zero displaced volume. Point A is determined with an empty sample chamber 34. Point B is a reading further along on sample coil 16 that indicates a specific volume on the vertical scale of FIG. 3. Point B may be obtained using a known volume. Points A and B are connected with a straight line so that any other volume may be determined within the range of the apparatus from any sample coil reading. For greater accuracy in measuring, the reference chamber 90 and the sample chamber 34 should contain the same approximate volume of air or other gas when a sample is in the sample chamber 34. This ideal can be approached either by making the reference chamber 90 smaller then the sample chamber 34 or by placing a balancing volume 114 in balancing chamber 90.

The invention must be calibrated before using it to determine volumes. This calibration may be necessary because of changes in humidity and temperature.

A known volume is placed in the sample chamber 14 and the mercury is pressurized until the mercury reaches a preselected reference point in the reference coil 14. At this time the position of the mercury in the sample coil 16 is recorded. Point B of graph of FIG. 3 is thus obtained. The sample chamber 34 is then emptied and resealed and the mercury is pumped to the same point in the reference coil 14 as before. A reading is then taken of the mercury in the sample coil 16. This gives point A on the graph of FIG. 3.

The points A and B are than connected by a straight line.

It is now possible to determine any volume reading within the range of the graph by getting a corresponding reading of sample coil 16 using coil 14 as a reference.

It will be understood that the graph of FIG. 3 may be reduced to a mathematical formula for greater speed and accuracy in volume determination.

To measure very small volumes, the invention may be used in an amplifier mode by using a very small chamber. In this mode liquid is pumped to a reference point in the sample coil 16. The liquid in the reference coil 14 is now representative of the volume of the very small sample. Although the invention has been described with reference to a specific imbodiment, it is to be understood that it is intended to cover all modifications and equivalents within the scope of the appended claims.

What is claimed is:

1. The process of measuring the volume of a sample which comprises the steps of:
    A. Placing a volume sample in one of at least two communicating volume scaled chambers,
    B. Simultaneously changing the pressure with a liquid in said volume scaled chambers,
    C. Obtaining a reading by observing the relative movement of the liquid in the two volume scaled chambers,
    D. Inserting the reading of step C into a predetermined formula or graph to determine the volume of the sample.

2. The process of claim 1 wherein one of said chambers is larger than the other of said chambers whereby small volumes may be measured with precision due to the relative movement of the liquid in said volume scaled chambers.

3. An apparatus for measuring the volume of a sample comprising at least two communicating volume scaled chambers, means to simultaneously change the pressure in the volume scaled chambers, volume compression indicating means associated with each of said chambers, and means to insert a volume sample in at least one of said chambers.

4. The apparatus of claim 3 wherein the volume scaled chambers are of unequal size to obtain an amplification effect for greater accuracy in measurement.

5. The apparatus of claim 4 where the volume compression indicating means is a liquid.

6. The apparatus of claim 5 wherein the means to simultaneously change the pressure is at least one piston.

7. The apparatus of claim 4 wherein at least one of the volume scaled chambers includes a portion that is a coil.

8. The apparatus of claim 7 wherein the liquid is visible in at least one of the coils.

9. The apparatus of claim 8 wherein the chamber volume scaling comprises at least one volume scaled coil overlay.

* * * * *